June 14, 1960
R. S. MEHNERT
2,940,204
ARTIFICIAL FISHING LURE CONSTRUCTION
Filed June 21, 1957
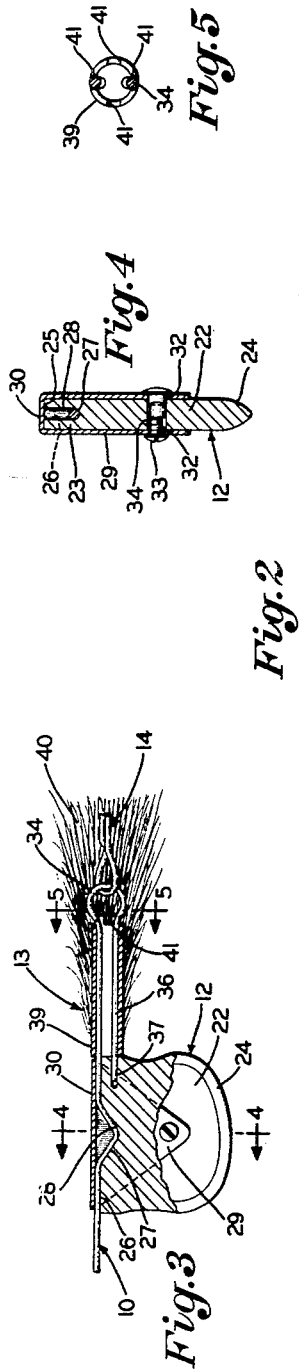
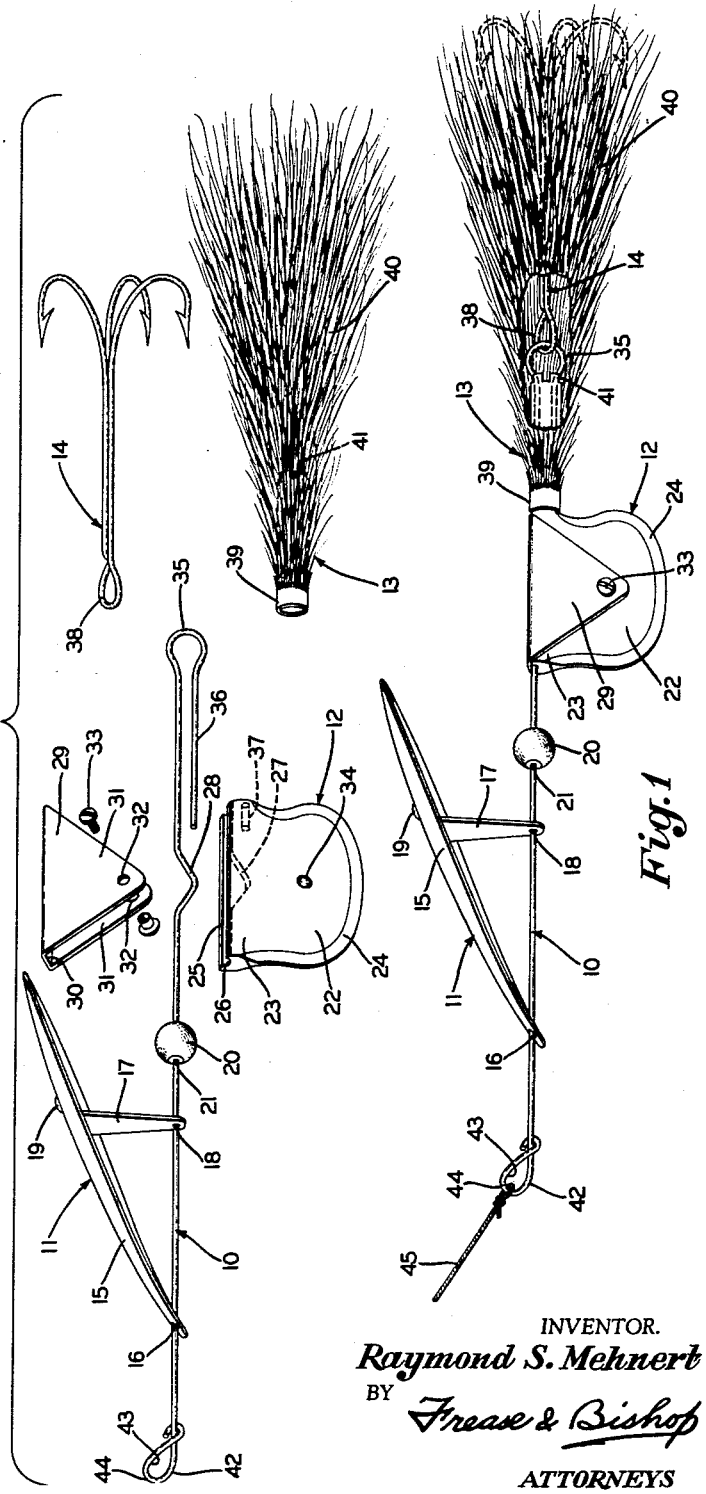
INVENTOR.
Raymond S. Mehnert
BY
Frease & Bishop
ATTORNEYS

United States Patent Office 2,940,204
Patented June 14, 1960

2,940,204

ARTIFICIAL FISHING LURE CONSTRUCTION

Raymond S. Mehnert, 435 W. Columbia St., Alliance, Ohio

Filed June 21, 1957, Ser. No. 667,175

3 Claims. (Cl. 43—42.09)

My invention relates to improvements in artificial fishing lure construction and more specifically to a unique and advantageous spinner fishing lure construction.

Most prior constructions of spinner fishing lures have included a wire-like shaft having a generally flat spinning blade rotatably mounted thereon so that when the spinner is attached to a fishing line and moved through the water the spinning blade will rotate around the shaft and serve to attract fish. Certain of these prior constructions of spinners have been provided with some form of trailer or streamer, such as the conventional bucktail, which extends back over the hooks of the spinner, disguising the hooks and also further attracting fish to the spinner.

The principal difficulty with these prior types of spinners is that as the spinner is moved through the water and the spinning blade thereon rotates around the shaft, the entire spinner also tends to rotate, thereby twisting the fishing line. Further, if a trailer or streamer such as a bucktail is used, the trailer is also rotated, which is undesirable since most bucktails are designed to be positioned with certain light colored portions thereof extending directly downwardly in order to resemble a certain form of fish or bait.

In an attempt to overcome the twisting difficulties of these prior spinner constructions, certain efforts have been made to attach so-called keel weights to the shafts of the spinners, with these keel weights also being generally blade-like but extending generally perpendicularly away from the spinner shaft while still being generally parallel thereto. If these keel weights are securely attached to the spinner shaft and are properly designed, they will prevent the entire spinner assembly from rotating as the spinning blade thereof rotates.

This, however, has required that the keel weights be permanently attached to the spinner shaft so that, dependent on the weight of the particular keel weight, a given spinner will travel at a predetermined given depth in the water, and this will remain constant for the same speed of travel of the spinner through the water. Thus, a different spinner is required for various depths at which it is desired to have the spinner travel and also, since these keel weights are attached to a relatively small diameter wire-like shaft, the weights frequently become loose on the shaft so that the spinner is not prevented from rotating and the keel weight may accidentally move axially along the shaft to an undesirable position.

Still further, when these prior constructions of spinners have been provided with a trailer such as a bucktail, the trailer has generally been attached directly to the hooks of the spinner. Thus, if it is desired for any reason to change the hooks of these prior spinner constructions, it is also necessary to change the particular trailer, thereby requiring each hook or hooks to be used with the spinners to be provided with separate trailers.

It is therefore a general object of the present invention to provide a spinner fishing lure construction which overcomes the difficulties and disadvantages of prior spinner constructions as hereinbefore set forth.

It is a primary object of the present invention to provide a spinner fishing lure construction which has various means formed thereon for positively preventing the spinner assembly from rotating under normal conditions.

It is a further object of the present invention to provide a spinner fishing lure construction having a keel weight removably and interchangeably mounted on the shaft thereof to prevent the spinner assembly from rotating as the spinning blade thereof rotates, so that not only is the twisting of the fishing line prevented, but also so that various keel weights may be selectively mounted on the spinner shaft for allowing the spinner to travel at various preselected water depths for a given speed of travel through the water.

It is still a further object of the present invention to provide a spinner fishing lure construction having a keel weight mounted on the shaft thereof in such a way that the keel weight is positively engaged with the shaft, thereby preventing any possible accidental rotation of the shaft with reference to the keel weight or preventing the keel weight from moving axially of the shaft to an undesired position.

Additionally, it is an object of the present invention to provide a spinner fishing lure construction in which, if any trailer such as a bucktail is used with the spinner assembly, the trailer is mounted separate from the hooks of the spinner and is also preferably mounted so that the trailer is prevented from in any way rotating with reference to the shaft of the spinner, thereby allowing free interchangeability of the hooks of the spinner without removal of the trailer thereof and also insuring that the trailer will remain in its proper desired position.

Finally, it is an object of the present invention to provide a spinner fishing lure construction which provides all of the above advantageous features but yet is simple in construction and can be manufactured for a relatively small cost.

These and other objects are accomplished by the parts, constructions, arrangements, combinations and subcombinations comprising the present invention, the nature of which is set forth in the following general statement, a preferred embodiment of which—illustrative of the best mode in which applicant has contemplated applying the principles—is set forth in the following description and illustrated in the accompanying drawings, and which is particularly and distinctly pointed out and set forth in the appended claims forming a part hereof.

In general terms the spinner fishing lure construction comprising the present invention may be stated as including a preferably wire-like shaft having a leading or forward end and a trailing or rearward end, spinning blade means rotatably mounted on the shaft, keel weight means preferably removably and nonrotatably mounted on the shaft, and means on the shaft trailing end for preferably removably attaching a hook or hooks to said trailing end. The construction may also include means at the shaft leading end for attaching a fishing line thereto in such a manner so as to aid in preventing axial rotation of the shaft upon rotation of the spinning blade means.

Finally, the construction may include tube means preferably having trailer or streamer means secured thereto with the tube means being positioned preferably between the keel weight means and the shaft trailing end and preferably engaging the shaft hook attaching means. The trailer or streamer means preferably extends rearwardly beyond the trailing end of the shaft, with the engagement of the tube means with the hook attaching means preferably preventing rotation of said trailer or streamer means with respect to the shaft.

By way of example, an embodiment of the spinner fishing lure construction of the present invention is illustrated in the accompanying drawings forming a part hereof, wherein like numerals indicate similar parts throughout the several views, and in which:

Fig. 1 is a side elevation of the spinner fishing lure construction comprising the present invention with a part thereof broken away to show certain of the details of such construction;

Fig. 2, an exploded view of the construction of Fig. 1 showing the various removable parts thereof in disassembled form;

Fig. 3, a side fragmentary view taken from Fig. 1, part in elevation and part in section, showing certain of the details of the spinner shaft, keel weight means, trailer or streamer means, attaching tube and shaft hook attaching means;

Fig. 4, a sectional view, part in elevation, looking in the direction of the arrows 4—4 in Fig. 3; and Fig. 5, a sectional view, part in elevation, looking in the direction of the arrows 5—5 in Fig. 3.

The spinner fishing lure construction comprising the present invention, as shown in the drawings, is provided with a preferably wire-like cylindrical shaft, generally indicated at 10, a spinning blade assembly, generally indicated at 11, a keel weight assembly, generally indicated at 12, a trailer or streamer assembly, generally indicated at 13, and a hook, generally indicated at 14. The spinning blade assembly 11 includes a spinning blade 15 rotatably attached toward the leading end, that is, the left-hand end as shown in the drawings, of the shaft 10, with the leading end of blade 15 having a hole 16 formed therein and the shaft 10 being received therethrough.

Blade 15 extends at an acute angle to shaft 10 from the leading to the trailing end of blade 15, with this blade further preferably being rotatably supported on shaft 10 by means of a support 17. Support 17 is positioned intermediate the length of blade 15 and extends generally radially from shaft 10 to blade 15, with support 17 also having a hole 18 formed therein through which the shaft 10 is rotatably received.

Further, support 17 is secured to blade 15 by any conventional means such as the rivet 19, as shown. To insure proper rotation of the spinning blade 15 around the shaft 10 when the spinner is moved through the water, a bearing bead 20 is preferably mounted between support 17 and the keel weight assembly 12, with bead 20 having the shaft 10 received through a hole 21 in said bead, and with the bead being formed of any conventional material such as glass, plastic or metal.

Thus, when the spinner is moved through the water, the spinning blade 15 and support 17 will move rearwardly away from the extreme leading end of shaft 10 until support 17 bears against bead 20 and bead 20 bears axially against the keel weight assembly 12. The blade 15 may then rotate around shaft 10 and against bead 20, with bead 20 forming a thrust bearing.

The keel weight assembly 12 includes a generally blade-like keel weight 22, preferably formed of a heavy metal such as lead, and the weight 22 is preferably provided with a thickened upper portion 23 and an inwardly tapered arcuate cornered lower portion 24, as shown, so that weight 22 will move through the water with a minimum of water resistance. The upper surface 25 of weight upper portion 23 is preferably provided with a groove 26 formed therein and extending the length thereof, with groove 26 being formed with a lengthwise deeper V-shaped portion 27 preferably intermediate the length of groove 26 and extending axially of shaft 10.

Further, shaft 10 is provided with a lengthwise V-shaped portion 28 matching or mating the V-shaped portion 27 of the keel weight groove 26. A relatively thin preferably sheet metal attaching strap 29 is provided for removably attaching keel weight 22 to shaft 10 with the keel weight groove V-shaped portion 27 receiving the shaft V-shaped portion 28, as best seen in Figs. 2 and 3.

Strap 29 is preferably generally triangular shaped in side elevation, as shown, including a generally flat top portion 30 and the side generally triangular portions 31, with side portions 31 having aligned holes 32 formed therein for receiving a fastening screw 33 therethrough. Thus, a portion of shaft 10 rearwardly of spinning blade assembly 11 and toward the trailing end of shaft 10 may be received in the keel weight groove 26, with the groove V-shaped portion 27 receiving the shaft V-shaped portion 28, and the attaching strap 29 may be received over shaft 10, with the strap top portion 30 covering shaft 10 and abutting the top surface 25 of keel weight 22.

In this position the side portions 31 of strap 29 will abut the sides of keel weight 22 and fastening screw 33 may be received through the strap holes 32 and a hole 34 formed in the lower portion 24 of keel weight 22, thereby securely, yet removably, retaining the keel weight 22 properly positioned on shaft 10.

The trailing or right-hand end of shaft 10, as shown in the drawings, extends rearwardly from the keel weight assembly 12 and is provided at its extreme trailing end with a hook fastening loop 35. Further, shaft 10, after forming the fastening loop 35, may extend forwardly or away from the extreme trailing end thereof and be provided with an engagement portion 36 received in a generally forwardly extending hole 37 formed in the rearward or trailing end of keel weight 22. Thus, when the keel weight assembly 12 is secured to shaft 10, as before described, the shaft engagement portion 36 will be received in the keel weight hole 37.

Further, when it is desired to attach or receive any conventional hook 14, such as the treble hook shown, to shaft 10, it is merely necessary to remove attaching strap 29 from keel weight 22, thereby removing keel weight 22. The loop 38 of hook 14 may then be slipped over shaft engagement portion 36 so that the hook loop 38 is received over the hook fastening loop 35 and it is then merely necessary to reassemble the keel weight assembly 12.

If it is desired to provide a trailer or streamer assembly 13, this assembly, according to the principles of the present invention, is formed from a preferably metal or plastic tube 39, with tube 39 having the desired streamer such as the bucktail 40 attached thereto around the outer surface thereof. Further, the rearward end of tube 39, or the end thereof covered by the bucktail 40, is provided with a series of diametrically opposite rearwardly opening slots 41.

Thus, when it is desired to provide the trailer or streamer surrounding and camouflaging the hook 14, it is merely necessary to remove the keel weight 22 as before described, removed hook 14 as before described, bend the shaft engagement portion 36 outwardly away from the main portion of the shaft and slip the tube 39 over shaft portion 36 around loop 35 and upwardly along the length of shaft 10 forwardly adjacent the V-shaped portion 28. The shaft end portion 36 may be then bent back to its position shown in Figs. 2 and 3, the hook 14 reassembled, and both the main portion and end portion 36 of shaft 10 received in tube 39, with tube 39 being moved rearwardly until two diametrically opposite slots 41 engage the shaft hook fastening loop 35.

With the trailer or streamer assembly 13 thusly assembled, it will extend rearwardly away from the trailing end of shaft 10 over hook 14. Furthermore, the slots 41 of tube 39 being engaged with the shaft hook fastening loop 35 will prevent the assembly 13 for rotating with reference to shaft 10.

Finally, the extreme leading end of shaft 10 is provided with a line fastening loop 42 to which the end of fishing line may be attached. According to the principles of the present invention, loop 42 is provided with the opening 43 thereof formed so that the leading or forwardmost extremity 44 of opening 43 is spaced radially from the axis of shaft 10 whereby when the end of the fishing line 45, as shown in Fig. 1, is attached to loop 42, line 45 will pull the spinner assembly through the water from the loop opening extremity 44, that is, at a point spaced radially from the axis of shaft 10.

Thus, with the spinner fishing lure construction as herein described, the shaft 10 is prevented from rotating from the rotation of the spinning blade assembly 11 by the shaft V-shaped portion 28 being engaged in the keel weight groove V-shaped portion 27 so that keel weight 22 is securely attached to shaft 10 and shaft 10 cannot accidentally rotate with reference to the keel weight. Further, this attachment of keel weight 22 to shaft 10 may be additionally, or separately secured to weight 22 without the provision of the foregoing V-shaped portions, by the shaft engagement portion 36 extending forwardly and removably engaging in the hole 37 of weight 22.

Still further, either of these particular formations of shaft 10 or keel weight assembly 12 may be aided by the particular construction of the shaft line fastening loop 42. Since the forward extremity 44 of opening 43 in this loop 42 is spaced radially from the axis of shaft 10, the line 45 will pull from this forward extremity 44 and thereby provide a leverage to prevent shaft 10 from rotating.

Also, with the foregoing construction the keel weight 22 is quickly and conveniently removable so that it may be replaced by a keel weight of lesser or greater weight, as desired. This is provided by the attachment means of keel weight 22 in the form of the strap 29 engaging over shaft 10 and attaching to keel weight 22 by means of fastening screw 33.

Furthermore, when the shaft V-shaped portion 28 and keel weight groove V-shaped portion 27 are provided for preventing rotation between keel weight 22 and shaft 10, the keel weight fastening means in the form of the attaching strap 29 serves to hold the shaft and weight V-shaped portions properly assembled. Also, the ready movability of keel weight 22 provides for convenient disengagement between keel weight 22 and the shaft and engagement portion 36 so that the hook 14 may be conveniently changed and the trailer or streamer assembly 13 conveniently added or changed.

Finally, by use of the particular trailer or streamer assembly 13 as described, the bucktail 40 or other form of streamer is separately attached to the assembly so that the streamer or hook 14 may be independently removed and replaced. Also, with the provision of the slots 41 on the streamer assembly tube 39 engaging the shaft hook fastening loop 35, the bucktail 40 or other streamer may be selectively positioned with reference to shaft 10 so that desired portions of the bucktail or streamer are visible from given directions.

In the foregoing description, certain terms have been used for brevity, clearness and understanding but no unnecessary limitations are to be implied therefrom, because such words are used for description purposes herein and are intended to be broadly construed.

Moreover, the embodiment of the improved construction illustrated and described herein is by way of example and the scope of the present invention is not limited to the exact details of construction shown.

Having now described the invention, the construction, operation and use of a preferred embodiment thereof, and the advantageous new and useful results obtained thereby, the new and useful construction and reasonable mechanical equivalents thereof obvious to those skilled in the art are set forth in the appended claims.

I claim:

1. Fishing lure construction including an axially extending shaft having a leading and trailing end, a spinning blade rotatably mounted on the shaft, the trailing end of the shaft having a looped portion terminating in a forward extending portion extending toward the leading end of the shaft and forming means for attaching a fishing hook to said trailing end, a tube telescoped over the shaft and at least a part of the forward extending portion, the tube being positioned abutting the looped portion, means removably mounted on the shaft confining the tube against axial movement with respect to the shaft and abutting the looped portion, the tube having a series of diametrically opposed slots formed therein opening toward the looped portion, the looped portion being partially received in certain of the tube slots preventing relative rotation between the tube and shaft, a streamer attached to the tube and extending rearwardly over the looped portion, and means at the leading end of the shaft for attaching a fishing line thereto.

2. Fishing lure construction including an axially extending shaft having a leading and trailing end, a spinning blade rotatably mounted on the shaft, the trailing end of the shaft having a looped portion terminating in a forward extending portion extending toward the leading end of the shaft and forming means for attaching a fishing hook to said trailing end, a tube telescoped over the shaft and at least a part of the forward extending portion, the tube being positioned abutting the looped portion, keel weight means having a top portion and sides, the keel weight means being positioned with the top portion abutting the shaft and the sides extending away from and generally axially of the shaft, the keel weight means being positioned axially of the shaft abutting the tube and confining the tube against axial movement with respect to the shaft and abutting the looped portion, means on the tube engaged with the looped portion preventing relative rotation between the tube and shaft, a streamer attached to the tube and extending rearwardly over the looped portion, projection means on the shaft engageable by the keel weight means during said abutment for preventing rotation and axial movement between the shaft and keel weight means when assembled, a strap member telescoped over a portion of the shaft and a portion of the keel weight means top portion and sides, the strap member confining said shaft portion against the keel weight means top portion and extending away from said shaft portion along the keel weight means sides, means operably connected to the strap member and keel weight means sides for removably securing said strap member in said telescoped position and maintaining the shaft and keel weight means assembled, and means at the leading end of the shaft for attaching a fishing line thereto.

3. Fishing lure construction including an axially extending shaft having a leading and trailing end, a spinning blade rotatably mounted on the shaft, the trailing end of the shaft having a looped portion terminating in a forward extending portion extending toward the leading end of the shaft and forming means for attaching a fishing hook to said trailing end, a tube telescoped over the shaft and at least a part of the forward extending portion, keel weight means having a top portion and sides, the keel weight means being positioned with the top portion abutting the shaft and the sides extending away from and generally axially of the shaft, the keel weight means being positioned axially of the shaft abutting the tube and confining the tube against axial movement with respect to the shaft and abutting the looped portion, the tube having a series of diametrically opposed slots formed therein opening toward the looped portion, the looped portion being partially received in certain of the tube slots preventing relative rotation between the tube and shaft, a streamer attached to the tube and extending rearwardly over the looped portion, projection means on the shaft engageable by the keel weight means during said abutment for preventing rotation and axial movement between the shaft and keel weight means when assembled, a strap member telescoped over a portion of the shaft and a portion of the keel weight means top portion and sides, the strap member confining said shaft portion against the keel weight means top portion and extending away from said shaft portion along the keel weight means sides, means operably connected to the strap member and keel weight means sides for removably securing said strap member in said telescoped position and maintaining the shaft and keel weight means assembled, and means at the leading end of the shaft for attaching a fishing line thereto.

References Cited in the file of this patent

UNITED STATES PATENTS

| | | |
|---|---|---|
| 1,546,701 | Bailer | July 21, 1925 |
| 1,582,171 | Foss | Apr. 27, 1926 |
| 1,713,041 | Fey | May 14, 1929 |
| 1,731,161 | Farley | Oct. 8, 1929 |
| 1,754,567 | Newell | Apr. 15, 1930 |
| 2,168,894 | Arbogast | Aug. 8, 1939 |
| 2,180,822 | Gruenhagen | Nov. 21, 1939 |
| 2,435,730 | Worden | Feb. 10, 1948 |
| 2,674,823 | Gellings | Apr. 13, 1954 |
| 2,682,128 | Weigandt | June 29, 1954 |